(12) United States Patent
Kwon

(10) Patent No.: US 10,543,801 B2
(45) Date of Patent: Jan. 28, 2020

(54) AIRBAG FOR VEHICLE

(71) Applicants: Hyundai Motor Company, Seoul (KR); Kia Motors Corporation, Seoul (KR)

(72) Inventor: Hyock In Kwon, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 161 days.

(21) Appl. No.: 15/827,025

(22) Filed: Nov. 30, 2017

(65) Prior Publication Data

US 2019/0054890 A1 Feb. 21, 2019

(30) Foreign Application Priority Data

Aug. 18, 2017 (KR) ........................ 10-2017-0104771

(51) Int. Cl.
  *B60R 21/233* (2006.01)
  *B60R 21/2338* (2011.01)
  *B60R 21/231* (2011.01)

(52) U.S. Cl.
  CPC ...... *B60R 21/23138* (2013.01); *B60R 21/233* (2013.01); *B60R 21/2338* (2013.01); *B60R 2021/23146* (2013.01); *B60R 2021/23161* (2013.01); *B60R 2021/23308* (2013.01)

(58) Field of Classification Search
  CPC ........ B60R 2021/23146; B60R 21/233; B60R 2021/23308; B60R 2021/23386; B60R 21/2338; B60R 21/23138; B60R 32/307
  See application file for complete search history.

(56) References Cited

U.S. PATENT DOCUMENTS

| | | | |
|---|---|---|---|
| 5,636,862 A | 6/1997 | Cheung et al. | |
| 5,730,464 A * | 3/1998 | Hill ................... | B60R 21/23138 280/730.2 |
| 6,959,945 B2 | 11/2005 | Fischer et al. | |
| 8,480,125 B1 | 7/2013 | Belwafa et al. | |
| 8,480,128 B2 | 7/2013 | Fukawatase et al. | |

(Continued)

FOREIGN PATENT DOCUMENTS

| | | | | |
|---|---|---|---|---|
| DE | 9405143 U1 * | 5/1994 | ........... | B60R 21/207 |
| JP | 2006008105 A | 1/2006 | | |

(Continued)

*Primary Examiner* — Ruth Ilan
(74) *Attorney, Agent, or Firm* — Slater Matsil, LLP

(57) ABSTRACT

An airbag for a vehicle includes an airbag cushion and a tether. The airbag cushion is installed on one side of a seat and is composed of multiple chambers. When the airbag is deployed, the airbag cushion extends to a front side of the seat and the chambers are consecutively arranged in a superior-inferior direction of the seat. The tether connects the chambers to each other or connects one chamber to a vehicle body. The multiple chambers include a normal chamber deployed to the front side of the seat and a confining chamber bent toward an occupant when being deployed. The confining chamber is pressed by the adjacent normal chamber, or pulled or pressed by the tether. Thus, a front half portion of the confining chamber is folded toward a rear half portion of the confining chamber, thereby coming into tight contact with the occupant.

16 Claims, 10 Drawing Sheets

(56) References Cited

U.S. PATENT DOCUMENTS

| | | | |
|---|---|---|---|
| 8,632,094 B2 * | 1/2014 | Schmidt | B60R 21/23138 280/730.2 |
| 8,684,408 B2 | 4/2014 | Thomas et al. | |
| 9,266,494 B2 * | 2/2016 | Wang | B60R 21/237 |
| 9,592,788 B2 | 3/2017 | Wiik et al. | |
| 9,598,044 B2 | 3/2017 | Fujiwara | |
| 9,771,046 B2 | 9/2017 | Lee | |
| 9,809,189 B2 * | 11/2017 | Grell | B60R 21/232 |
| 9,994,181 B1 | 6/2018 | Dubaisi et al. | |
| 10,023,147 B2 | 7/2018 | Kwon | |
| 10,189,432 B2 * | 1/2019 | Matsushita | B60N 2/427 |
| 10,259,420 B2 * | 4/2019 | Thomas | B60R 21/231 |
| 10,336,283 B2 * | 7/2019 | Rickenbach | B60R 21/233 |
| 2004/0051285 A1 | 3/2004 | Fischer | |
| 2006/0131847 A1 * | 6/2006 | Sato | B60R 21/207 280/730.2 |
| 2007/0108753 A1 | 5/2007 | Pang et al. | |
| 2009/0224520 A1 | 9/2009 | Higuchi | |
| 2012/0025499 A1 | 2/2012 | Shibayama et al. | |
| 2012/0049498 A1 * | 3/2012 | Wiik | B60R 21/23138 280/743.2 |
| 2012/0091697 A1 | 4/2012 | Wiik et al. | |
| 2012/0119475 A1 | 5/2012 | Choi et al. | |
| 2013/0076014 A1 * | 3/2013 | Thomas | B60R 21/231 280/743.2 |
| 2014/0035264 A1 | 2/2014 | Fukushima et al. | |
| 2014/0062069 A1 | 3/2014 | Fukawatase | |
| 2014/0097601 A1 | 4/2014 | Fukawatase et al. | |
| 2014/0151984 A1 | 6/2014 | Fukawatase et al. | |
| 2014/0284906 A1 | 9/2014 | Akiyama | |
| 2014/0333051 A1 | 11/2014 | Jo | |
| 2015/0076803 A1 | 3/2015 | Fujiwara | |
| 2015/0217714 A1 | 8/2015 | Fujiwara | |
| 2015/0274111 A1 | 10/2015 | Ishida et al. | |
| 2015/0314748 A1 * | 11/2015 | Mihm | B60R 21/23138 280/730.2 |
| 2016/0107602 A1 | 4/2016 | Nakashima | |
| 2016/0114755 A1 | 4/2016 | Matsuzaki et al. | |
| 2016/0114757 A1 | 4/2016 | Fujiwara | |
| 2016/0159306 A1 | 6/2016 | Fujiwara | |
| 2016/0167616 A1 * | 6/2016 | Wiik | B60R 21/23138 280/729 |
| 2016/0200278 A1 | 7/2016 | Wiik et al. | |
| 2016/0229369 A1 * | 8/2016 | Thomas | B60R 21/207 |
| 2017/0129444 A1 | 5/2017 | Fukawatase et al. | |
| 2017/0174174 A1 | 6/2017 | Ohno et al. | |
| 2017/0182963 A1 | 6/2017 | Hiraiwa et al. | |
| 2017/0182969 A1 | 6/2017 | Fujiwara | |
| 2017/0334386 A1 | 11/2017 | Park et al. | |
| 2018/0118150 A1 * | 5/2018 | Kwon | B60R 21/207 |
| 2018/0126944 A1 | 5/2018 | Choi | |
| 2018/0290619 A1 * | 10/2018 | Kitagawa | B60R 21/23138 |
| 2018/0326938 A1 | 11/2018 | Rickenbach et al. | |
| 2019/0016293 A1 * | 1/2019 | Saso | B60R 21/231 |
| 2019/0047504 A1 | 2/2019 | Sugishima et al. | |
| 2019/0054890 A1 | 2/2019 | Kwon | |
| 2019/0061675 A1 * | 2/2019 | Kwon | B60R 21/261 |
| 2019/0061676 A1 | 2/2019 | Kwon | |
| 2019/0092271 A1 | 3/2019 | Park et al. | |
| 2019/0152421 A1 | 5/2019 | Byun et al. | |
| 2019/0161053 A1 * | 5/2019 | Gwon | B60N 2/64 |

FOREIGN PATENT DOCUMENTS

| | | | |
|---|---|---|---|
| JP | 4165239 B2 | | 10/2008 |
| JP | 2009137441 A | | 6/2009 |
| JP | 2009234562 A | | 10/2009 |
| JP | 2010083414 A | | 4/2010 |
| JP | 2011240807 A | * | 12/2011 |
| JP | 2012051557 A | | 3/2012 |
| JP | 2014051138 A | | 3/2014 |
| JP | 5594340 B2 | | 9/2014 |
| JP | 5754436 B2 | | 7/2015 |
| JP | 2016083955 A | | 5/2016 |
| JP | 2016107721 A | | 6/2016 |
| JP | 2016203945 A | | 12/2016 |
| KR | 20080101478 A | | 11/2008 |
| KR | 20120051279 A | | 5/2012 |
| KR | 101262977 B1 | | 5/2013 |
| KR | 101292323 B1 | | 7/2013 |
| KR | 20140132188 A | | 11/2014 |
| KR | 20150001100 A | | 1/2015 |
| KR | 101637205 B1 | | 7/2016 |
| KR | 20170067962 A | | 6/2017 |
| WO | 2014033820 A1 | | 3/2014 |
| WO | 2017014421 A1 | | 1/2017 |

* cited by examiner

AIRBAG FOR VEHICLE

CROSS-REFERENCE TO RELATED APPLICATIONS

This application claims priority to Korean Patent Application No. 10-2017-0104771, filed on Aug. 18, 2017, which application is hereby incorporated herein by reference.

TECHNICAL FIELD

The present invention relates generally to an airbag for a vehicle.

BACKGROUND

Generally, recent vehicles are usually equipped with various types of airbags installed at various locations to protect occupants. Among such airbags, a side airbag is required to satisfy Euro NCAP criteria or US NCAP criteria for an oblique test and to protect occupants sitting with various postures, especially in an autonomous vehicle.

In the event of a side impact or an oblique impact, it is necessary to protect the heads of occupants by preventing the bodies of the occupants from moving forward or sideways, i.e. by preventing a driver and a passenger in front seats from colliding with each other or with a vehicle body.

Moreover, when an autonomous vehicle in which an occupant is lying down or is stretched out on a reclined seat or is sitting in a seat with a seatbelt fastened thereto is impacted, it is necessary to prevent neck injuries from the seatbelt and to safely protect the occupant in any riding posture. Therefore, a side airbag that can satisfy the requirements described above is needed.

The foregoing is intended merely to aid in the understanding of the background of the present invention, and is not intended to mean that the present invention falls within the purview of the related art that is already known to those skilled in the art.

SUMMARY

Embodiments of the present invention relate to an airbag for protecting an occupant in the event of a side impact. Particular embodiments relate to an airbag for a vehicle, the airbag being capable of protecting an occupant in various situations regardless of riding postures of the occupant, thereby accommodating recent impact modes that have been newly applied to recent vehicles, or introduction of autonomous vehicles. For example, an airbag for a vehicle is capable of protecting occupants in the event of a side impact or an oblique impact of a general vehicle or any impact of an autonomous vehicle.

According to an embodiment, the present invention provides an airbag for a vehicle. The airbag includes an airbag cushion located on one side of a seat, composed of a plurality of chambers, and extending to a front side of the seat when deployed. The chambers are consecutively arranged in a superior-inferior direction of the seat in a deployed state. A tether connects the chambers to each other or connects one chamber to a vehicle body. The plurality of chambers comprises a normal chamber being deployed to a front side of the seat and a confining chamber being bent toward an occupant sitting in the seat when being deployed. The confining chamber is pressed by the normal chamber or the tether or pulled by the tether such that a front half portion of the confining chamber is folded toward a rear half portion and comes into contact with the occupant.

The tether may be provided on one surface of the confining chamber, the surface being on an opposite side of the occupant. The confining chamber is pressed by the tether such that the front half portion of the confining chamber is folded toward the rear half portion of the confining chamber, thereby coming into contact with the occupant when the airbag cushion is deployed.

The airbag cushion may include an upper chamber, a middle chamber, and a lower chamber; the upper chamber and the lower chamber may correspond to the normal chamber; and the middle chamber may correspond to the confining chamber.

The tether may connect the upper chamber and the lower chamber, thereby limiting a distance between the upper chamber and the lower chamber when the airbag cushion is deployed, so that the middle chamber and the upper chamber are pressed by the lower chamber to be bent toward the occupant.

The tether may connect the upper chamber and the lower chamber, and the tether may press a surface of the middle chamber, the surface being on an opposite side of the occupant, such that middle chamber is bent toward the occupant.

The upper chamber and the lower chamber may be provided with a first through-hole and a second through-hole, respectively. The tether may be installed such that a first end thereof is fixed to the seat or the airbag cushion and a second end thereof extends to the front side of the seat, then passes through the first through-hole, then extends downward along a surface of the middle chamber, which is disposed on the opposite side of the occupant, then passes through the second through-hole, then extends to a rear side of the seat, and is finally fixed to the seat or the airbag cushion.

The upper chamber may be provided with a third through-hole disposed in front of the first through-hole. The tether may sequentially pass through the first through-hole, pass through the third through-hole, extend downward, and pass through the second through-hole.

When the airbag cushion is deployed, the distance between the upper chamber and the lower chamber is limited by the tether, so that the middle chamber is not displaced to be further away from the occupant.

When the airbag cushion is fully inflated, an upper end of the upper chamber and a lower end of the lower chamber incline toward the occupant to support the occupant.

The airbag cushion may include an upper chamber, a middle chamber, and a lower chamber; the upper chamber may correspond to the confining chamber. The middle chamber and the lower chamber may correspond to the normal chamber.

The upper chamber may extend to a front side of the seat such that a front portion of the upper chamber is disposed in front of a neck of the occupant when the airbag is fully inflated.

A tether may be installed inside the upper chamber such that the upper chamber is pulled by the tether and thus the occupant is confined to the seat when the airbag cushion is deployed.

A seat belt may be installed to be positioned between the upper chamber and the middle chamber, thereby preventing the seat belt from tightly fastening a neck of the occupant.

Both sides of the seat may be provided with the airbag cushions, respectively. When the airbag cushions are fully inflated, the upper chambers of the airbag cushions extend to a front side of the seat, front portions of the upper chambers are disposed in front of the neck of the occupant, and ends of the upper chambers of the airbag cushions come into contact with each other.

The airbag may further include a tether connected to an upper end of the seat; the tether may be provided with a tensioner; and the confining chamber may come into tight contact with the occupant due to actions of the tether and the tensioner when the airbag cushion is fully inflated, thereby preventing forward movement of the occupant.

As described above, the airbag for a vehicle according to the present invention can ensure safe protection of occupants by preventing the occupants from moving forwards or sideways. That is, the airbag protects the heads of occupants by preventing a collision between a driver and a passenger sitting in front seats or a collision between a driver or passenger and a vehicle body in the event of a side impact or an oblique impact.

When an accident of an autonomous vehicle occurs in a state in which a driver or a passenger is lying on a reclined seat or is sitting in a seat with a seat belt being fastened, the airbag of the present invention can prevent neck injuries or strangulation caused by the seat belt and protect occupants in both sitting postures and supine postures.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, an airbag for a vehicle, according to a preferred embodiment of the present invention, will be described in detail with reference to the accompanying drawings.

Figure 1:
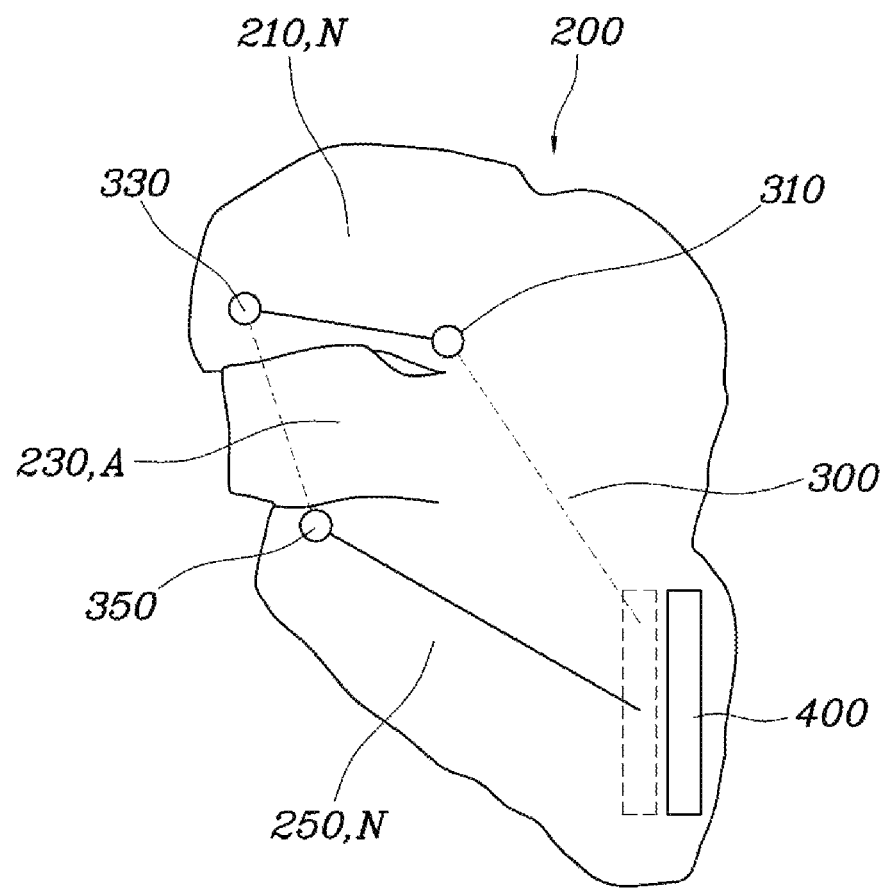
FIG. 1 is a schematic view illustrating an airbag cushion of an airbag for a vehicle, according to a first embodiment of the present invention.
Figure 7:
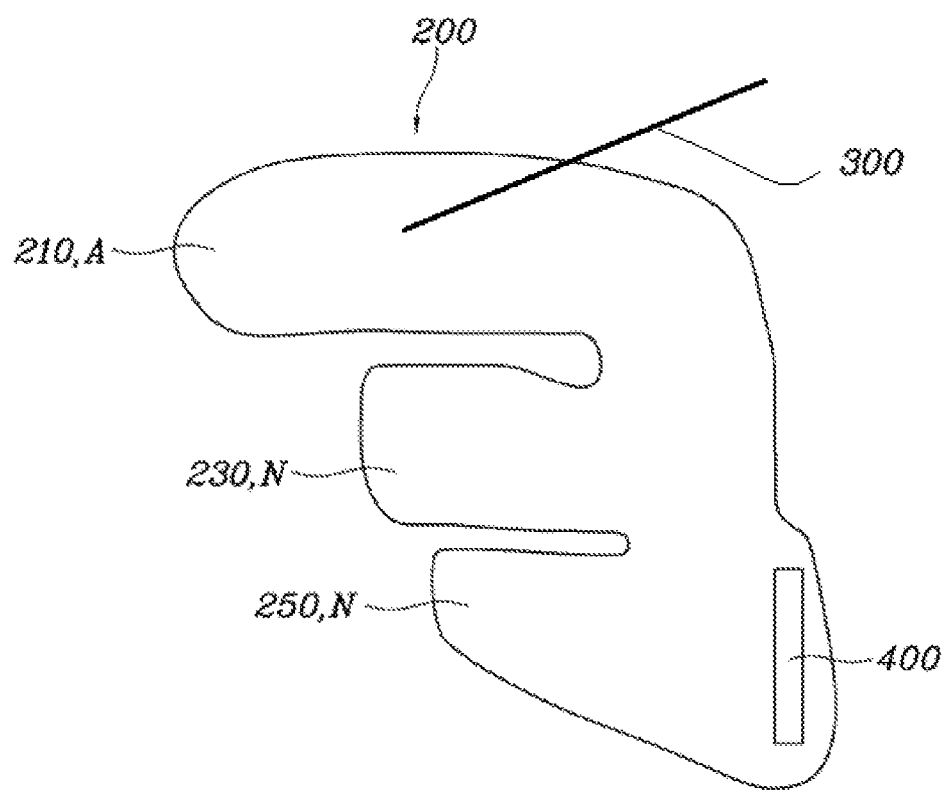
FIG. 7 is a schematic view illustrating an airbag cushion of an airbag for a vehicle, according to a second embodiment of the present invention.
Figure 8:
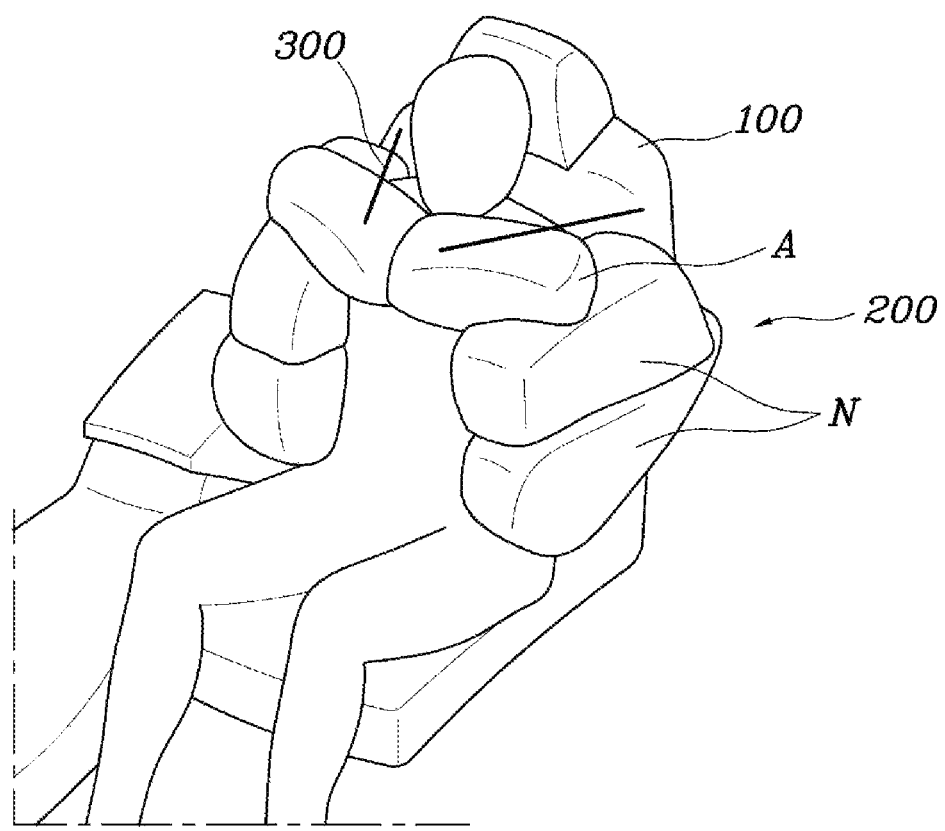
FIGS. 8 to 10 are views illustrating a deployed state of the airbag cushion of FIG. 7 under various conditions.
Figure 9:
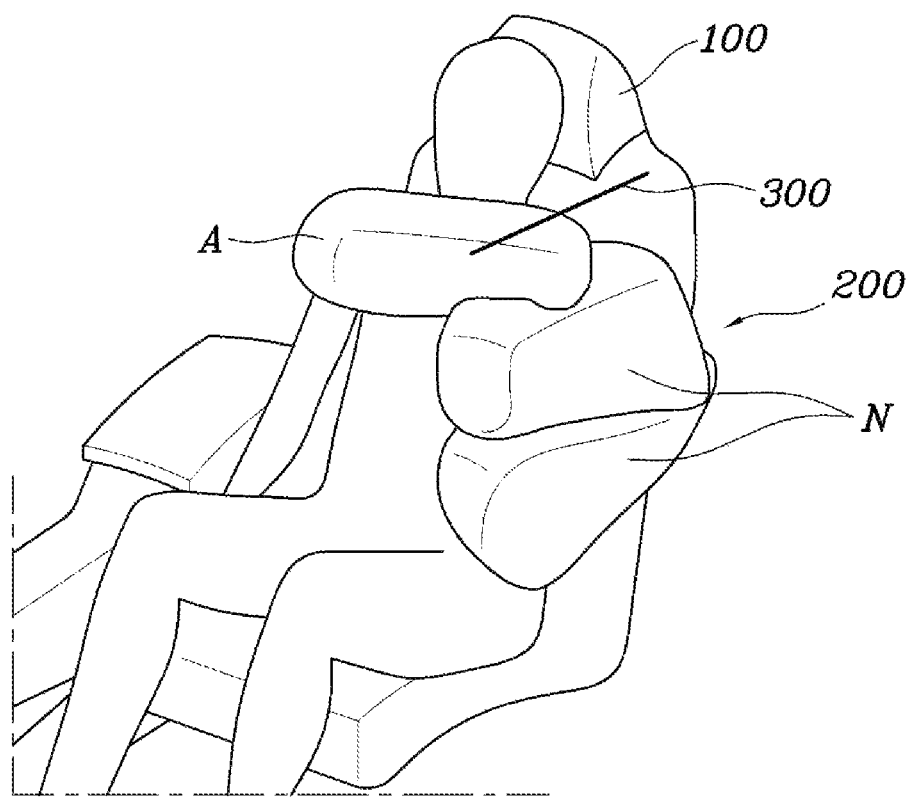
Figure 10:
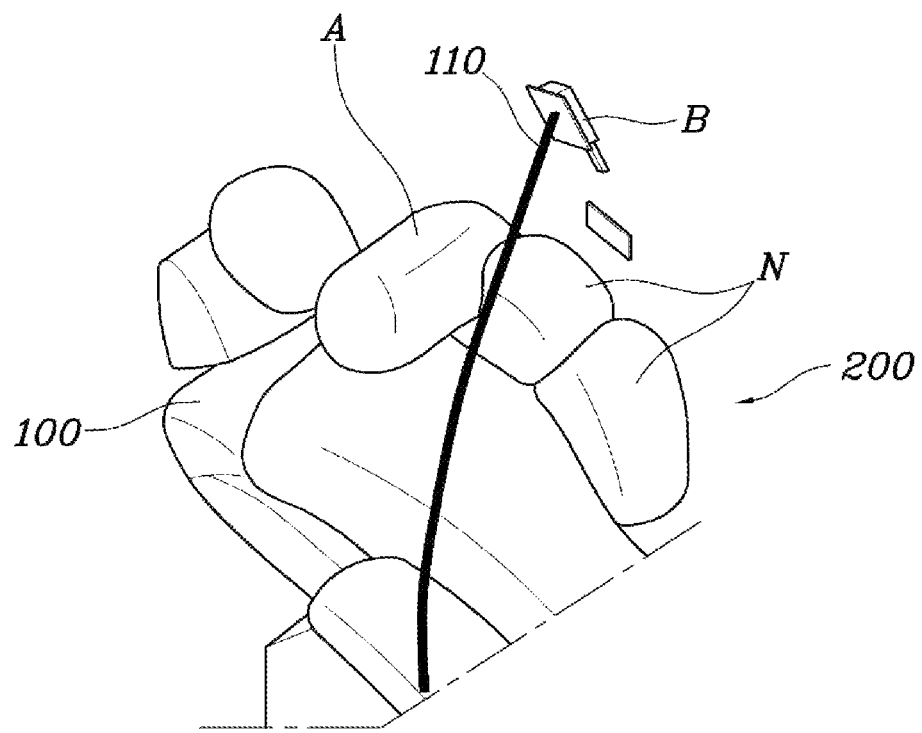

FIG. 1 is a schematic view illustrating an airbag cushion 200 of an airbag for a vehicle, according to a first embodiment of the present invention; FIGS. 2 to 6 are views illustrating a deployed state of the airbag cushion 200 of FIG. 1 under various conditions; FIG. 7 is a schematic view illustrating an airbag cushion 200 of an airbag for a vehicle, according to a second embodiment of the present invention; and FIGS. 8 to 10 are views illustrating a deployed state of the airbag cushion 200 of FIG. 7 under various conditions.

The airbag for a vehicle, according to the first embodiment of the present invention, includes an airbag cushion 200 and a tether 300. The airbag cushion 200 is installed on one side of a seat 100 and is composed of a plurality of chambers. When the airbag cushion 200 is deployed, the airbag is stretched to a front side of the seat 100, and the deployed chambers are consecutively arranged in a top-to-bottom direction of the seat 100. The tether 300 connects one chamber to another or connects one chamber to a vehicle body. The plurality of chambers includes a normal chamber N deployed forwards and a confining chamber A bent and stretched toward an occupant when deployed. The confining chamber A is pressed by the normal chamber N adjacent to the confining chamber A, or the confining chamber A is pulled by the tether 300 such that a front half thereof is folded toward the occupant and comes into tight contact with the occupant.

The airbag of the present invention includes the airbag cushion 200, an inflator 400 for introducing gas into the airbag cushion 200, the tether 300 pulling the airbag cushion 200, and a vent hole.

The airbag cushion 200 is installed on one side surface of the seat 100 and is composed of a plurality of chambers. When the airbag is deployed, the airbag cushion 200 is stretched to a front side of the seat 100 and the chambers are consecutively arranged in a top-to-bottom direction of the seat 100. Specifically, the chambers deployed in front of the seat 1 include a normal chamber N and a confining chamber A. The confining chamber A is pressed by the adjacent normal chamber N or is pulled or pressed by the tether 300. Thus, a front half portion of the chamber is folded toward a rear half portion of the chamber to come into tight contact with the occupant, thereby confining the occupant to the seat.

According to the first embodiment of the present invention, the airbag cushion 200 is composed of three chambers. Specifically, the airbag cushion 200 includes an upper chamber 210, a middle chamber 230, and a lower chamber 250. However, the number of the chambers may vary depending on environments or designs.

The airbag cushion 200 includes the tether 300 that pulls the chamber toward the occupant, thereby confining the occupant to the seat. The tether 300 is disposed on one surface (the opposite side surface of the occupant) of the confining chamber A. Accordingly, when the airbag cushion 200 is deployed, the confining chamber A is pressed by the tether 300 and is thus folded such that the front half portion thereof approaches the occupant and comes into contact therewith. Specifically, the tether 300 connects the upper chamber 210 and the lower chamber 250. Therefore, when the airbag cushion 200 is deployed, the tether 300 limits the distance between the upper chamber 210 and the lower chamber 250 such that the middle chamber 230 is pressed by the upper chamber 210 and the lower chamber 250. Thus, the middle chamber is bent toward the occupant.

The tether 300 connects the upper chamber 210 with the lower chamber 250, and the tether 300 presses one surface (i.e., opposite side surface of the occupant) of the middle chamber 230. Therefore, the middle chamber 230 is bent toward the occupant. More specifically, the upper chamber 210 and the lower chamber 250 are provided with a first through-hole 310 and a second through-hole 350, respectively. The tether 300 is installed such that a first end thereof is fixed to the seat 100 or to the airbag cushion 200, and a second end thereof first extends to a front side of the seat, then passes through the first through-hole 310, then extends downward along the surface of the middle chamber 230, then passes through the second through-hole 350, then extends to a rear side of the seat, and is finally fixed to the seat 100 or the airbag cushion 200.

According to a second embodiment, the upper chamber 210 is provided with a third through-hole 330 disposed in front of the first through-hole 310 and the tether 300 is installed such that the second thereof passes through the first through-hole 310, then passes through the third through-hole, then extends downward, then passes through the second through-hole 350, and is finally fixed to the seat. According to this embodiment, when the airbag cushion 200 is deployed, the middle chamber 230 is bent toward the occupant, thereby confining the occupant to the seat.

In addition, when the airbag cushion 200 is deployed, the distance between the upper chamber 210 and the lower chamber 250 is limited by the tether 300, the middle chamber 230 is not displaced to be further away from the occupant. Particularly, when the airbag cushion 200 is fully inflated, an upper end of the upper chamber 210 and a lower end of the lower chamber 250 incline toward the occupant to support the body thereof.

One side surface of the airbag cushion 200 is provided with the inflator 400. The inflator 400 is disposed below the seat and installed to be erect in the top-to-bottom direction of the vehicle. Therefore, the airbag cushion 200 has a compact structure. The airbag cushion 200 is further provided with the vent hole (not illustrated) through which the inside and the outside of the airbag cushion 200 communicate with each other. The locations and types of the inflator 400 and the vent hole may vary according to environments and designs. Since the inflator 400 and the vent hole are essential elements of an airbag, existing inflators and vent holes may be applied to the airbag of the present invention. Accordingly, a detailed description of the inflator 400 and the vent hole will be omitted.

The airbag of the present invention will be described in more detail with reference to the accompanying drawings.

Figure 2:
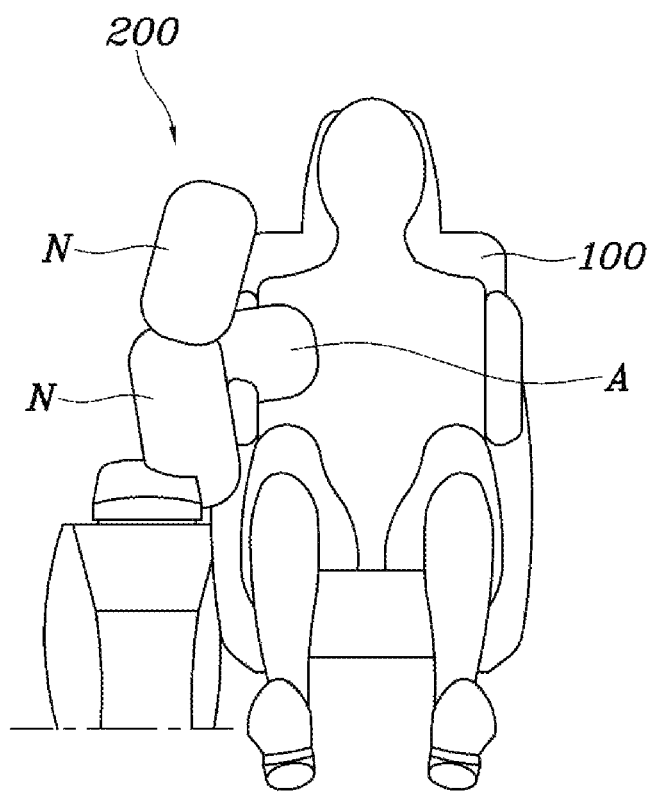
FIGS. 2 to 6 are views illustrating a deployed state of the airbag cushion of FIG. 1 under various conditions.

As illustrated in FIG. 2, the airbag of the present invention is disposed between a driver seat and a passenger seat. The airbag cushion 200 includes the upper chamber 210, the middle chamber 230, and the lower chamber 250. The upper chamber 210 and the lower chamber 250 correspond to the normal chamber N, and the middle chamber 230 corresponds to the confining chamber A. Therefore, when the airbag cushion 200 is deployed, the front half portion of the middle chamber 230 serving as the confining chamber A is bent toward the occupant, thereby coming into tight contact with the occupant to confine the occupant to the seat. Therefore, it is possible to prevent the occupant from being injured by colliding with the vehicle body in the event of a side impact collision or an oblique impact collision.

The middle chamber 230 serving as the confining chamber A is pulled by the tether 300 and thus the distance between the upper chamber 210 and the lower chamber 250 is maintained. Therefore, the middle chamber 230 first confines the shoulders of the occupant to the seat at an early stage, and then confines the shoulders and arms of the occupant, and the upper chamber 210 confines the head of the occupant so that the head cannot move sideways. The middle chamber 230 may be a self-supporting tether 300.

When the airbag cushion 200 is fully inflated, the upper end of the upper chamber 210 and the lower end of the lower chamber 250 incline toward the occupant, thereby supporting the shoulders and the head of the occupant. Therefore, the middle chamber 230 can effectively support the body of the occupant and confine the occupant to the seat. Therefore, the airbag according to the present invention can effectively protect the occupant. When the middle chamber 230 is fully inflated, a front portion of the middle chamber protrudes further toward the occupant than a rear portion thereof, thereby effectively protecting the occupant.

Figure 3:
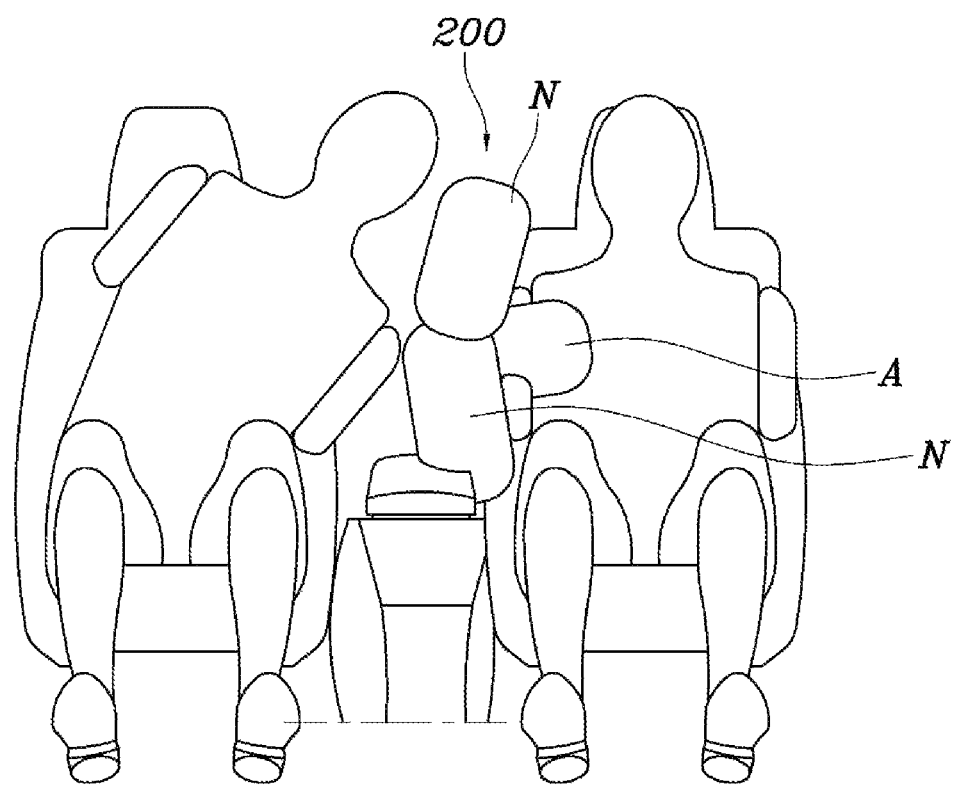

FIG. 3 illustrates a state in which a driver and a passenger are sitting in a driver seat and a passenger seat, respectively. FIG. 3 differs from FIG. 2 in that not only the driver seat but the passenger seat is occupied. Generally, a driver seat and a passenger seat are relatively close to each other. Therefore, when an accident occurs, it is difficult to avoid a collision between the driver and the passenger. However, according the present invention, since the airbag of the present invention is disposed to provide a barrier between the driver and the passenger, it is possible to prevent the head of the driver from colliding with the head of the passenger. Moreover, even when a driver sits in any appropriate posture for driving, for example, when a driver drives with his or her arm placed on an armrest console as illustrated in FIGS. 2 and 3, since a front part of the airbag cushion 200 is branched into multiple chambers, gas pressure of the airbag cushion 200 is distributed to the multiple chambers. Therefore, the pressure applied to the occupant (i.e., driver) is also distributed, and thus the safety of the occupant is more securely ensured.

Figure 4:
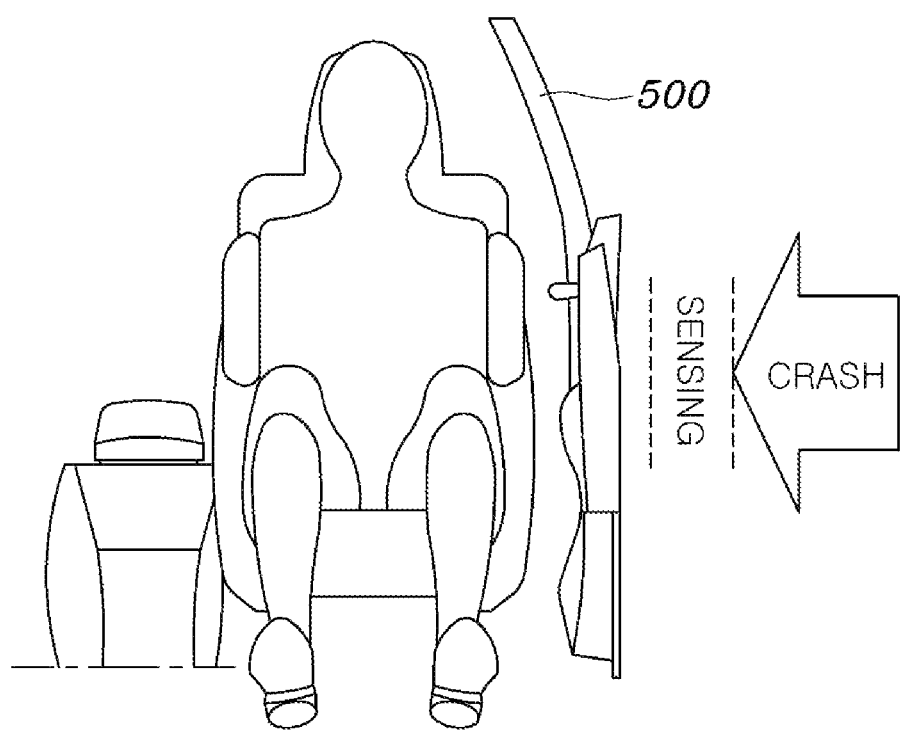
Figure 5:
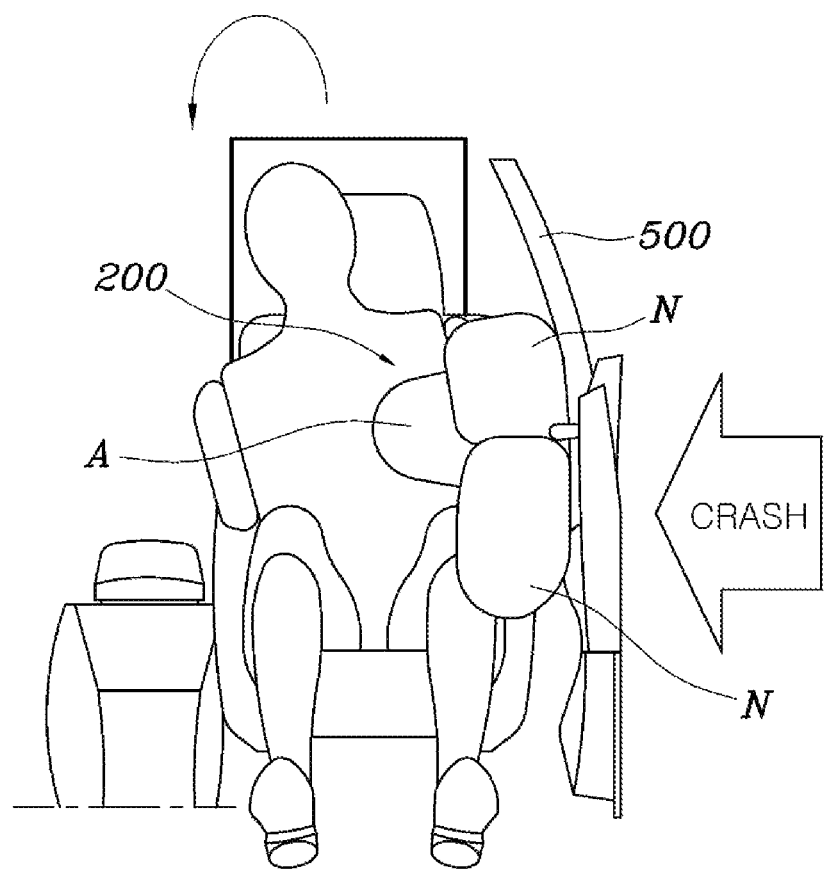

FIGS. 4 and 5 illustrate a side free-crash mode in a general or autonomous vehicle equipped with the airbag of the present invention. The airbag of the present invention is installed between a vehicle door 500 and an occupant, i.e. between the vehicle door 500 and the side surface of the seat 100. When a sensor (not illustrated) installed at one side of a vehicle body detects an impact, the airbag cushion 200 of the airbag between the vehicle door 500 and the occupant is promptly inflated such that the upper chamber 210, the middle chamber 230, and the lower chamber 250 push the occupant toward the opposite side, thereby increasing a protection area to provide safer protection of the occupant. This case may apply to a high speed side impact collision.

As illustrated in FIGS. 2 and 3, the airbag cushion 200 may be composed of the upper chamber 210, the middle chamber 230, and the lower chamber 250; the upper chamber 210 and the lower chamber 250 may serve as the normal chambers N; and the middle chamber 230 may serve as the confining chamber A. In this case, when the airbag cushion is fully inflated, a front portion of the middle chamber 230 protrudes further toward the occupant than a rear portion of the middle chamber, thereby providing more secure protection for the occupant.

Figure 6:
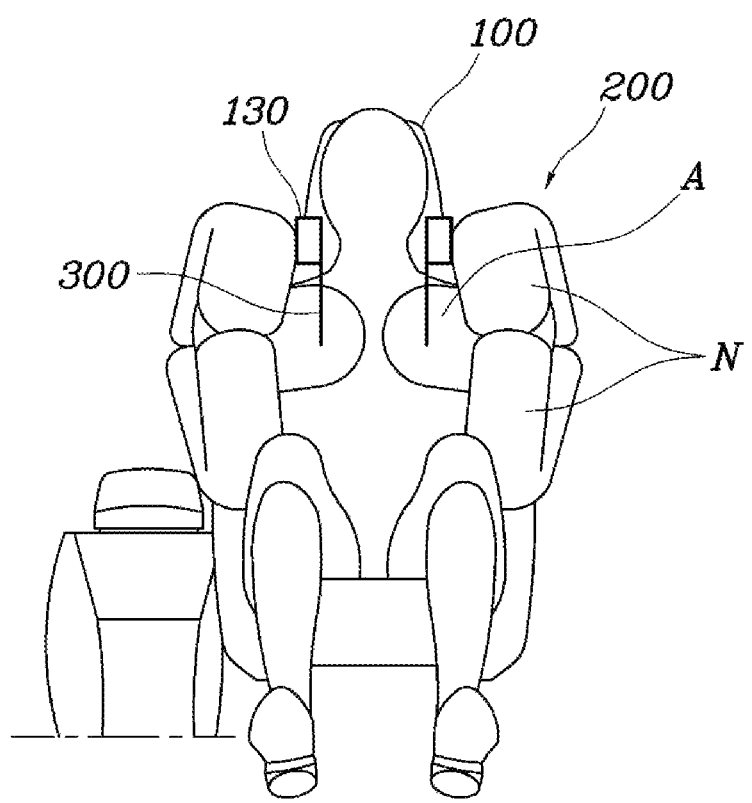

FIG. 6 illustrates a state in which a tether 300 connected to an upper end of a seat 100 is added to the state illustrated in FIGS. 2 to 5. The tether 300 is provided with a tensioner 130. When the airbag cushion 200 is fully inflated, the confining chamber A is moved to be in tight contact with the occupant due to the tether 300 and the tensioner 130, thereby preventing forward movement of the body of the occupant. The tensioner 130 may be an existing tensioner applied to a seat belt 110. As the airbag is equipped with both of the tether 300 and the tensioner 130, force of confining the occupant to the seat can be increased. In addition, both sides of the seat 100 may be equipped with the airbag cushions 200, respectively.

FIG. 7 is a view illustrating an airbag cushion of an airbag for a vehicle, according to a second embodiment of the present invention, and FIGS. 8 to 10 illustrate use examples in which the airbag cushion 200 of FIG. 7 is applied to an autonomous vehicle. As illustrated in FIG. 7, the airbag for a vehicle, according to the present invention, is installed between a vehicle door 500 and a driver seat 100. This embodiment is described in regard to a state in which an occupant rides an autonomous vehicle in a supine posture. The airbag cushion 200 includes an upper chamber 210, a middle chamber 230, and a lower chamber 250. The upper chamber 210 is a confining chamber A and the middle chamber 230 and the lower chamber 250 are normal chambers N.

According to the second embodiment, the upper chamber 210 serving as the confining chamber A extends to a front side of the seat. When the airbag cushion 200 is fully inflated, a front half portion of the upper chamber 210 is disposed at the front of the neck of an occupant. The inside of the upper chamber 210 is provided with a tether. Thus, when the airbag cushion 200 is deployed, the upper chamber 210 is pulled by the tether 300, thereby confining the occupant to the seat. In the second embodiment, a seat belt 110 installed on a B piller is disposed between the upper chamber 210 and the middle chamber 230. Therefore, when a vehicle collision occurs, it is possible to prevent the occupant from being strangulated due to the seat belt no tightly fastening around the neck of the occupant.

Furthermore, as illustrated in FIG. 8, there are two airbag cushions 200 installed on respective sides of the seat 100. When the airbag cushions 200 are fully inflated, the upper chambers 210 of the airbag cushions 200 extend to the front side of the seat 100 to be disposed in front of the occupant, and ends of the upper chambers 210 are in contact with each other. In this manner, the upper chambers can more securely confine the occupant to the seat, thereby preventing forward movement of the occupant.

Therefore, as illustrated in FIG.8, when the airbag cushion 200 is deployed, a front half portion of the upper chamber 210 serving as the confining chamber A comes into tight contact with the occupant to confine the occupant to the seat, thereby protecting the occupant. In addition, as illustrated in FIG. 6, a tether 300 is connected to an upper end of the seat 100. The tether 300 is provided with a tensioner 130. The tether 300 and the tensioner 130 may be designed such that the tether 300 and the tensioner 130 make the confining chamber A come into tight contact with the occupant to confine the occupant to the seat, thereby preventing forward movement of the occupant when the airbag cushion 200 is fully inflated.

The airbag for a vehicle, according to the present invention, can prevent a driver and a passenger from moving forwards or sideways, thereby preventing the driver and the passenger from colliding with each other or with a vehicle body, thereby protecting the heads of the occupants, in the event of a side impact or an oblique impact. That is, the airbag can provide securer protection of occupants of a vehicle.

In addition, in the case in which the airbag of the present invention is applied to an autonomous vehicle, when an impact is applied to the vehicle in a state in which a driver or a passenger is lying down on a fully reclined seat 100 or when a driver or a passenger is wearing a seat belt 110, it is possible to prevent neck injuries or strangulation of the driver or the passenger due to the seat belt no being fastened. Therefore, the airbag of the present invention provides secure protection of an occupant, regardless of riding posture of the occupant.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An airbag for a vehicle, the airbag comprising:
an airbag cushion located on one side of a seat and extending to a front side of the seat when deployed, the airbag cushion composed of a plurality of chambers, that are consecutively arranged in a superior-inferior direction of the seat in a deployed state; and
a tether connecting the chambers to each other or connecting one chamber to a vehicle body,
wherein the plurality of chambers comprises a normal chamber being deployed to a front side of the seat and a confining chamber configured to be bent toward an occupant sitting in the seat when being deployed, the confining chamber being pressed by the normal chamber or the tether or pulled by the tether such that a front half portion of the confining chamber is folded toward a rear half portion and is configured to come into contact with the occupant;
wherein the airbag cushion comprises an upper chamber, a middle chamber, and a lower chamber;
wherein the upper chamber and the lower chamber correspond to respective normal chambers; and
wherein the middle chamber corresponds to the confining chamber.

2. The airbag according to claim 1, wherein the tether is provided on one surface of the confining chamber, the surface configured to be on an opposite side of the occupant; and
wherein the confining chamber is pressed by the tether such that the front half portion of the confining chamber is folded toward the rear half portion of the confining chamber, thereby configured to come into contact with the occupant when the airbag cushion is deployed.

3. The airbag according to claim 1, wherein the tether connects the upper chamber and the lower chamber, thereby limiting a distance between the upper chamber and the lower chamber when the airbag cushion is deployed, so that the middle chamber and the upper chamber are pressed by the lower chamber configured to be bent toward the occupant.

4. The airbag according to claim 1, wherein the tether connects the upper chamber and the lower chamber and wherein the tether presses a surface of the middle chamber such that the middle chamber is configured to be bent toward the occupant, the surface being on an opposite side of the occupant.

5. The airbag according to claim 1, wherein the upper chamber and the lower chamber are provided with a first through-hole and a second through-hole, respectively; and
wherein the tether is installed such that a first end thereof is fixed to the seat or the airbag cushion and a second end thereof extends to the front side of the seat, then passes through the first through-hole, then extends downward along a surface of the middle chamber, which is configured to be disposed on the opposite side of the occupant, then passes through the second through-hole, then extends to a rear side of the seat, and is finally fixed to the seat or the airbag cushion.

6. The airbag according to claim 5, wherein the upper chamber is provided with a third through-hole disposed in front of the first through-hole; and
wherein the tether sequentially passes through the first through-hole, passes through the third through-hole, extends downward, and passes through the second through-hole.

7. The airbag according to claim 1, wherein when the airbag cushion is deployed, the distance between the upper chamber and the lower chamber is limited by the tether so the middle chamber is configured to not be displaced further away from the occupant.

8. The airbag according to claim 1, wherein when the airbag cushion is fully inflated, an upper end of the upper chamber and a lower end of the lower chamber are configured to incline toward the occupant to support the occupant.

9. The airbag according to claim 1, further comprising a tether connected to an upper end of the seat, the tether being provided with a tensioner, wherein the confining chamber is configured to come into tight contact with the occupant due to actions of the tether and the tensioner when the airbag cushion is fully inflated, thereby preventing forward movement of the occupant.

10. An airbag for a vehicle, the airbag comprising:
an airbag cushion located on one side of a seat and extending to a front side of the seat when deployed, the airbag cushion composed of a plurality of chambers, that are consecutively arranged in a superior-inferior direction of the seat in a deployed state; and
a tether connecting the chambers to each other or connecting one chamber to a vehicle body,
wherein the plurality of chambers comprises a normal chamber being deployed to a front side of the seat and a confining chamber configured to be toward an occupant sitting in the seat when being deployed, the confining chamber being pressed by the normal chamber or the tether or pulled by the tether such that a front half portion of the confining chamber is folded toward a rear half portion and is configured to come into contact with the occupant;
wherein the airbag cushion comprises an upper chamber, a middle chamber, and a lower chamber;
wherein the upper chamber corresponds to the confining chamber;
wherein the middle chamber and the lower chamber correspond to respective normal chambers; and
wherein the airbag further comprising a seat belt installed to be positioned between the upper chamber and the middle chamber so that the seat belt is prevented from tightly fastening a neck of the occupant.

11. The airbag according to claim 10, wherein the upper chamber extends to a front side of the seat such that a front portion of the upper chamber is configured to be disposed in front of a neck of the occupant when the airbag is fully inflated.

12. The airbag according to claim 10, wherein the tether is connected with the upper chamber such that the upper chamber is pulled by the tether and thus the occupant is confined to the seat when the airbag cushion is deployed.

13. The airbag according to claim 10, wherein the airbag cushion comprises a first airbag cushion;
wherein the airbag further comprises a second airbag cushion located at a second side of the seat; and
wherein when the first and second airbag cushions are fully inflated, the upper chambers of the first and second airbag cushions extend to a front side of the seat, front portions of the upper chambers are configured to be disposed in front of the neck of the occupant, and ends of the upper chambers of the first and second airbag cushions come into contact with each other.

14. A vehicle comprising:
a seat;
an airbag cushion located on one side of the seat, the airbag cushion composed of a plurality of chambers, and extending to a front side of the seat when deployed, the chambers being consecutively arranged in a superior-inferior direction of the seat in a deployed state; and
a tether connecting the chambers to each other or connecting one chamber to a vehicle body,
wherein the plurality of chambers comprises a normal chamber being deployed to a front side of the seat and a confining chamber configured to be bent toward an occupant sitting in the seat when being deployed, the confining chamber being pressed by the normal chamber or the tether or pulled by the tether such that a front half portion of the confining chamber is folded toward a rear half portion and is configured to come into contact with the occupant, wherein the airbag cushion comprises an upper chamber, a middle chamber, and a lower chamber;
wherein the upper chamber and lower chamber correspond to respective normal chambers; and
wherein the middle chamber corresponds to the confining chamber.

15. The vehicle according to claim 14, further comprising a second airbag cushion located on a second side of the seat, the second airbag cushion composed of a plurality of chambers that are consecutively arranged in a superior-inferior direction of the seat in a deployed state.

16. A vehicle comprising:
a seat;
an airbag cushion located on one side of the seat, the airbag cushion composed of a plurality of chambers, and extending to a front side of the seat when deployed, the chambers being consecutively arranged in a superior-inferior direction of the seat in a deployed state; and a tether connecting the chambers to each other or connecting one chamber to a vehicle body,
wherein the plurality of chambers comprises a normal chamber being deployed to a front side of the seat and a confining chamber configured to be bent toward an occupant sitting in the seat when being deployed, the confining chamber being pressed by the normal chamber or the tether or pulled by the tether such that a front half portion of the confining chamber is folded toward a rear half portion and is configured to come into contact with the occupant;
a second airbag cushion located on a second side of the seat the second airbag cushion composed of a plurality of chambers that are consecutively arranged in a superior-inferior direction of the seat in a deposed state;
wherein the airbag cushion and the second airbag cushion each comprise an upper chamber, a middle chamber and a lower chamber; and wherein when the airbag cushion and the second airbag cushion are fully inflated, the upper chambers of the airbag cushion and the second airbag cushion extend to a front side of the seat, front portions of the upper chambers are configured to be disposed in front of the neck of the occupant, and ends of the upper chambers of the airbag cushion and the second airbag cushion come in contact with each other.

* * * * *

UNITED STATES PATENT AND TRADEMARK OFFICE
CERTIFICATE OF CORRECTION

PATENT NO. : 10,543,801 B2
APPLICATION NO. : 15/827025
DATED : January 28, 2020
INVENTOR(S) : Hyock In Kwon Page 1 of 1

It is certified that error appears in the above-identified patent and that said Letters Patent is hereby corrected as shown below:

In the Claims

In Column 10, Lines 43-44, Claim 16, delete "a second side of the seat the second airbag cushion composed of" and insert --a second side of the seat, the second airbag cushion composed of--.

In Column 10, Line 46, Claim 16, delete "deposed" and insert --deployed--.

Signed and Sealed this
Twenty-first Day of July, 2020

Andrei Iancu
*Director of the United States Patent and Trademark Office*